United States Patent Office 2,755,101
Patented July 17, 1956

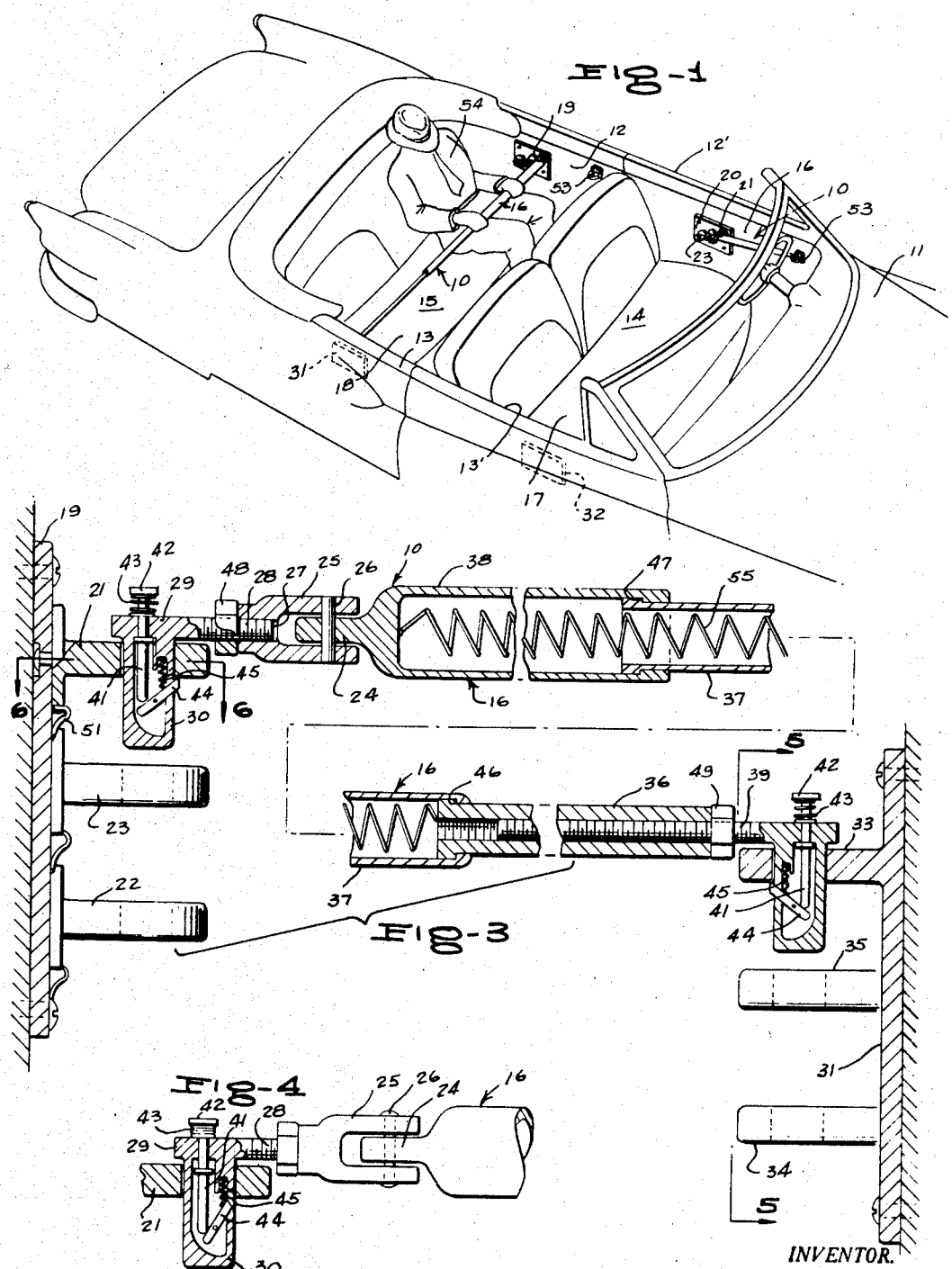

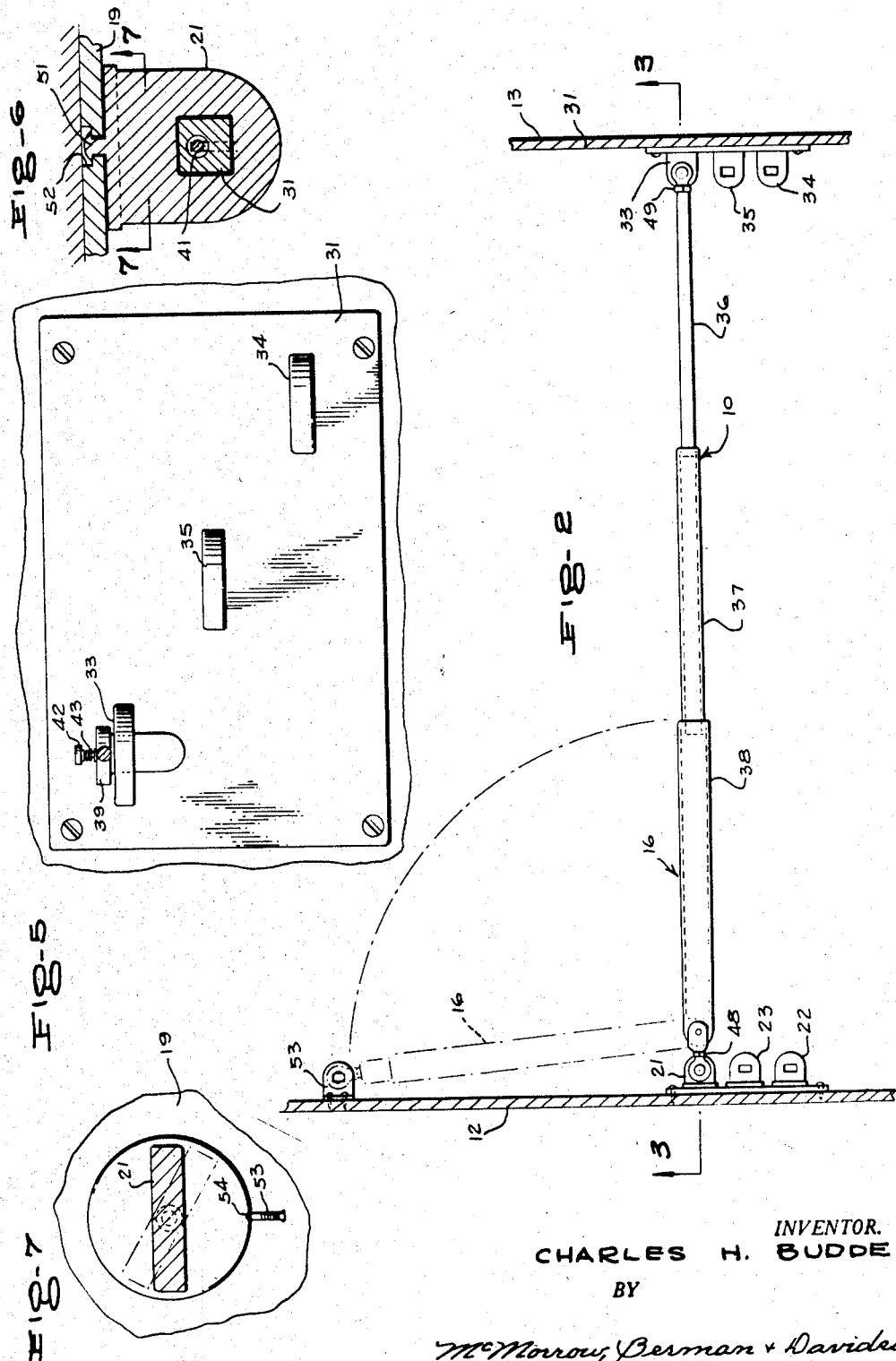

2,755,101

SAFETY PASSENGER-HOLDING DEVICE

Charles H. Budde, St. Louis, Mo.

Application August 5, 1955, Serial No. 526,657

3 Claims. (Cl. 280—150)

The present invention relates to a safety device adapted to hold passengers on the seat of an automobile.

An object of the present invention is to provide a device for holding a passenger on an automobile seat so that the passenger cannot be thrown forwardly of the seat when the automobile makes a sudden stop or thrown upwardly of or free of the seat if the automobile should run over a bump or be overturned.

Another object of the present invention is to provide a passenger-holding device for use in an automobile and one which also hold the doors of the automobile in closed position.

A further object of the present invention is to provide in a safety device for use in an automobile a rigid member extending across the laps of the operator and the passenger seated beside the operator, the member serving as a restraint against forward movement of the operator and passenger on the automobile seat and also serving as a handhold or hand rest for the passenger.

A still further object of the present invention is to provide a safety device for use in an automobile which is of simple structure, sturdy in construction, one which is extensile and retractile so that it may be positioned across the laps of the operator and the passenger in the automobile in the extended position and in the retracted position secured to a side wall of the automobile or one of the doors of the automobile.

These and other objects and advantages of the present invention will be fully apparent from the following description when taken in connection with the annexed drawings, in which:

Figure 1 is an isometric view of an automobile showing the device of the present invention installed adjacent the front seat of the automobile and another one installed adjacent the rear seat of the automobile, the one adjacent the front seat being shown in a retracted and out-of-use position, and the one adjacent the rear seat of the automobile being shown in an extended and of-use position, Figure 2 is a top plan view of the device of the present invention showing in full lines its position extended between the side walls of the automobile, the side walls being broken away, and showing in dotted lines the retracted position, Figure 3 is a sectional view taken on the line 3—3 of Figure 2 with the central portion of the device broken away, Figure 4 is a detailed view partially in cross-section showing the release mechanism of the means for supporting one end of the device to the bracket on the side wall of the automobile, Figure 5 is an elevational view taken on the line 5—5 of Figure 3, Figure 6 is a sectional view taken on line 6—6 of Figure 3, and Figure 7 is a sectional view on the line 7—7 of Figure 6.

Referring in greater detail to the drawings in which like numerals indicate like parts throughout the several views, the safety passenger-holding device of the present invention is indicated generally by the reference numeral 10 and is for use with an automobile body 11 having spaced sides 12 and 13, a front seat-and-back assembly 14, and a rear seat-and-back assembly 15, the seat-and-back assemblies being disposed transversely of the sides 12 and 13. The device 10 comprises an extensible and retractable bar 16 disposed in overlying spaced relation with respect to each of the seats 17 and 18 of the seat-and-back assemblies 14 and 15, respectively, inwardly of the free end of each of the seats 17 and 18. A bracket 19 is fixedly secured to the one side 12 of the body 11 adjacent one end of the bar 16 which overlies the seat 15 and another bracket 20 is fixedly secured to the door 12' in the side 12 adjacent the one end of the other bar 16. The structure of the bars 16, the brackets 19 and 20, and the means for connecting the bars to the brackets is identical, and will be described in detail with reference to the bar 16 and the bracket 19. The bar 16 associated with the seat 15 is shown in the extended position overlying the seat 15 and the other bar 16 is shown in the retracted position in side by side relation with respect to the door 12'.

A plurality of ledges 21, 22, and 23 project from the bracket 19 and are arranged in vertical spaced relation, the uppermost ledge 21 being at the highest level and adjacent the front edge of the bracket 19, the lowermost ledge 22 being at the lowest level and adjacent the back edge of the bracket 19, and the intermediate ledge 23 positioned between the ledges 21 and 22 and intermediate the levels of the ledges 21 and 22.

Means is provided for detachably connecting the one end of the bar 16 to a selected one of the ledges 21 to 23, inclusive, for pivotal movement about a vertical axis from the position overlying the seat 19 to a position in side by side relation with respect to the one side 12 forwardly of the bracket 19. Specifically, such means embodies a flattened end portion 24 on the one end of the bar 16, a clevis 25, and a pivot pin 26 extending through aligned apertures in the end portion 24 of the bar 16 and the clevis 25. The clevis 25 is provided with a threaded bore 27 extending inwardly from the end remote from the pivot pin 26, the bore 27 receiving the threaded portion 28 of a coupling element 29 having a square and hollow shank 30. The shank 30 is received in a square hole in the selected one of the ledges 21 to 23, inclusive, of the bracket 19 for selectively positioning the coupling element 29 at the back edge of the bracket and adjacent the lower end of the bracket, intermediately of the side edges and the top and bottom edges of the bracket, or at the forward edge of the bracket and adjacent the upper end of the bracket. This adjustment of the coupling element 29 with reference to the bracket 19 permits the bar 16 to be placed in such a position with reference to the seat 15 that individuals of different sizes may be accommodated upon the seat and protected by the bar 16.

A support member 31 is provided for the other end of the bar 16 which is associated with the seat 15 and another support member 32 is provided for the other end of the bar 16 which is associated with the seat 14, the support members 31 and 32 being shown in dotted lines in Figure 1. The structure of each of the support members 31 and 32 is identical and will be described in detail with reference to the support member 31.

Ledges 33, 34, and 35 project from the support member 31 and each has a vertically-disposed aperture therein. Means is provided for connecting the other end of the bar 16 to a selected one of the ledges 33 to 35, inclusive, and embodies a sleeve 36 having internal threads slidably mounted in the tubular element 37 and forming with the tubular element 37 and another tubular element 38 the extensile and retractile bar 16. A coupling element 39 extends by one end into the sleeve 36 and is threadedly engaged with the sleeve 36 so that the total length of the bar 16 may be made adjustable to fit automobiles of various widths. The other end of the coupling element 39 is received in the aperture in the selected one of the ledges 33 to 35, inclusive, for securing the bar in its position overlying the seat, as seen in Figure 1. The support member 31 is fixedly secured to the side 13 of the automobile and the support member 32 is fixedly secured to the door 13' of the automobile.

Means is provided for locking the coupling element 29 in the aperture in the selected one of the ledges 21 to 23, inclusive, and for locking the end of the coupling element 39 in the aperture in one of the ledges 33 to 35, inclusive, such means being identical and described with reference to the coupling element 29 in the ledge 21. Specifically, this means embodies a plunger 41 having a button 42 on its upper end with a spring 43 biasing the plunger 41 upwardly. A latch element 44 is pivotally connected to the shank 30 of the coupling element 29 intermediate its ends and has one end biased outwardly by a spring 45 to a slot in the shank 30, the other end of the latch element being engaged by the lower end of the plunger 41 to effect its movement, as shown in Fig. 4, out of locking engagement with the underside of the ledge with which the shank of the coupling element is engaged.

Cooperating stops 46 and 47 are provided between the adjacent ends of the sleeve 36 and the tubular element 37, and between the tubular element 37 and the tubular element 38, respectively, to prevent the outward movement of the component parts of the bar beyond their extended position. Lock nuts 48 and 49 on the threaded portions of the coupling elements 29 and 39, respectively, keep the associated parts in their adjusted position.

In Figure 6, the ledge 21 is shown in sectional view and is seen to have a stem 51 received in a countersunk hole 52 in the back face of the bracket 19, permitting the bracket ledge to rotate about a horizontal axis. In Figure 7, a spring 53 is shown received in a detent notch 54 in the periphery of the base of the ledge 21 and forming a means for maintaining the ledge 21 with its aperture vertically disposed. When the bar 16 is swung from its overlying position with respect to the seat to a position forwardly of the bracket and in an out-of-use position where the coupling element 39 is connectible to another support member 53 to hold it in the side by side position with respect to the side of the automobile or the door of the automobile, the spring 53 will slide out of the notch 54 permitting the bar to be raised from the horizontal position far enough so that the coupling element 39 may be engaged with the support member 53.

In use, the safety passenger-holding device of the present invention may be installed with the bracket 19 on either the side 12 or the side 13 and with the bracket 20 upon either the door 12' or the door 13' as desired, the support members 31 and 32 then being installed upon the opposite wall or door as the case may be. As shown in Figure 1, the bar 16 forms a handhold for an individual 54 seated upon the seat 15 and when in the extended position serves to protect the individual from being thrown forwardly or upwardly from the seat 15 in case the automobile strikes a bump or starts to overturn.

A spring 55 within the tubular elements 37 and 38 biases the tubular elements to the retracted position and assists in the retraction of the bar 16 to its folded position. While here shown as being constructed of tubular elements, the bar 16 may be made of channel members or may be made of components which fold one upon the other to form an extensile and retractile bar. When installed between the doors of an automobile the bar 16 will serve to hold the doors in a closed position, the bar 16 when in the retracted position upon the inner face of the doors of an automobile serving as arm rests, the retracted position being shown in dotted lines in Figure 2.

The safety device of the present invention when installed as above described will prevent the operator or his passenger from being thrown from the automobile should the automobile strike a bump or be overturned, and will also protect the passengers from being thrown forwardly when the automobile makes a sudden stop or collides with an obstacle.

What is claimed is:

1. For use with an automobile body having spaced sides and a seat-and-back assembly disposed transversely of said sides, a safety passenger-holding device comprising a bar adapted to be disposed in overlying spaced relation with respect to the seat of said assembly inwardly of the free end of the seat, a bracket adapted to be fixedly secured to one of said sides of said body adjacent one end of said bar, a plurality of ledges arranged in vertical spaced relation projecting from said bracket, the uppermost one of said ledges being at the highest level and adjacent the front edge of said bracket with the lowermost one of said ledges being at the lowest level and adjacent the back edge of said bracket and the intermediate one of said ledges being between and at a level intermediate the uppermost and lowermost ledges, means detachably connecting said one end of said bar to a selected one of said ledges for pivotal movement about a vertical axis from the position overlying the seat to a position in side by side relation with respect to said one side forwardly of said bracket, a support member adapted to be secured to the other of said sides adjacent the other end of said bar, a plurality of ledges arranged in vertical spaced relation projecting from said support member, the ledges on said support member being in horizontal alignment with the ledges on said bracket, and means detachably connecting said other bar end to the one of said ledges on said support member complemental to the selected one of the ledges on said bracket when said bar is in the overlying position.

2. For use with an automobile body having spaced sides, an openable and closable door in each side, and a seat-and-back assembly disposed transversely of said doors, a safety passenger-holding device comprising a bar adapted to be disposed in overlying spaced relation with respect to the seat of said assembly inwardly of the free end of the seat, a bracket adapted to be fixedly secured to one of said doors adjacent one end of said bar, a plurality of ledges arranged in vertical spaced relation projecting from said bracket, the uppermost one of said ledges being at the highest level and adjacent the front edge of said bracket with the lowermost one of said ledges being at the lowest level and adjacent the back edge of said bracket and the intermediate one of said ledges being between and at a level intermediate the uppermost and lowermost ledges, means detachably connecting said one end of said bar to a selected one of said ledges for pivotal movement about a vertical axis from the position overlying the seat to a position in side by side relation with respect to one door forwardly of said bracket, a support member adapted to be secured to the other of said doors adjacent the other end of said bar, a plurality of ledges arranged in vertical spaced relation projecting from said support member, the ledges on said support member being in horizontal alignment with the ledges on said bracket, and means detachably connecting said other bar to the one of said ledges on said support member complemental to the selected one of the ledges on said bracket when said bar is in the overlying position, said bar when in the overlying position and connected to the ledges of said bracket and support member holding the doors against opening movement.

3. For use with an automobile body having spaced sides and a seat-and-back assembly disposed transversely of said sides, a safety passenger-holding device comprising a bar adapted to be disposed in overlying spaced relation with respect to the seat of said assembly inwardly of the free end of the seat, a bracket adapted to be fixedly secured to one of said sides of said body adjacent one end of said bar, a plurality of ledges arranged in vertical spaced relation projecting from said bracket, the uppermost one of said ledges being at the highest level and adjacent the front edge of said bracket with the lowermost one of said ledges being at the lowest level and adjacent the back edge of said bracket and the intermediate one of said ledges being between and at a level intermediate the uppermost and lowermost ledges, means detachably connecting said one end of said bar to a selected one of said ledges for pivotal movement about a vertical axis from a position overlying the seat to a position in side by side relation with respect to said one side forwardly of said bracket, a support member adapted to be secured to the other of said sides adjacent the other end of said bar, a plurality of ledges arranged in vertical spaced relation projecting from said support member, the ledges on said support member being in horizontal alignment with the ledges on said bracket, and means detachably connecting said other bar end to the one of said ledges on said support member complemental to the selected one of the ledges on said bracket when said bar is in the overlying position, and a second support member adapted to be secured to said one side forwardly of and spaced from said bracket, said other bar end being connectable to said support member when said bar is in the side by side position.

References Cited in the file of this patent

UNITED STATES PATENTS

| | | |
|---|---|---|
| 199,545 | Hickey | Jan. 22, 1878 |
| 1,527,878 | Kolber | Feb. 24, 1925 |
| 1,973,011 | Morrison | Sept. 11, 1934 |
| 2,245,899 | Campbell | June 17, 1941 |

FOREIGN PATENTS

| | | |
|---|---|---|
| 582,985 | France | Oct. 24, 1924 |
| 1,068,580 | France | Feb. 3, 1954 |